(12) United States Patent     (10) Patent No.:   US 12,597,957 B2

Stahl et al.        (45) Date of Patent:     Apr. 7, 2026

(54) SLIDING TRANSPONDER SHIELD BOX

(71) Applicant: VM Consolidated, Inc., Mesa, AZ (US)

(72) Inventors: James Dean Stahl, Nyack, NY (US); Michael Wayne Ries, Gilbert, AZ (US); Warren Matthew Larson, Georgetown, TX (US)

(73) Assignee: VM Consolidated, Inc., Mesa, AZ (US)

( * ) Notice: Subject to any disclaimer, the term of this patent is extended or adjusted under 35 U.S.C. 154(b) by 296 days.

(21) Appl. No.: 18/473,535

(22) Filed: Sep. 25, 2023

(65) Prior Publication Data

US 2025/0105868 A1     Mar. 27, 2025

(51) Int. Cl.
    *H04B 1/3822*      (2015.01)
    *B60R 11/02*      (2006.01)
    *B60R 11/00*      (2006.01)

(52) U.S. Cl.
    CPC ............ *H04B 1/3822* (2013.01); *B60R 11/02* (2013.01); *B60R 2011/0026* (2013.01)

(58) Field of Classification Search
    CPC ...... H04B 1/38; H04B 1/3822; H04B 1/3827; H04B 1/285; B06R 11/00; B06R 11/02; B06R 2011/0003; B06R 2011/0026;

B06R 2011/0063; B06R 2011/0075; B06R 2011/008; B06R 2011/0082; B06R 2011/0084; B06R 2011/0094

See application file for complete search history.

(56) References Cited

U.S. PATENT DOCUMENTS

| | | | | |
|---|---|---|---|---|
| 6,127,938 A * | 10/2000 | Friedman | ............. | G07B 15/063 |
| | | | | 340/904 |
| 6,745,925 B2 * | 6/2004 | Brzyski | ................... | B60R 11/00 |
| | | | | 224/559 |
| 7,080,764 B2 * | 7/2006 | McNicholas | ........... | B60R 11/02 |
| | | | | 224/482 |
| 7,712,644 B2 * | 5/2010 | Rafalowitz | ............. | B60R 11/00 |
| | | | | 224/482 |
| 2004/0245303 A1 * | 12/2004 | Santayana | ............... | B60R 11/00 |
| | | | | 224/482 |
| 2014/0291369 A1 * | 10/2014 | Marsilla | ................. | B60R 11/00 |
| | | | | 224/482 |

* cited by examiner

*Primary Examiner* — Quochien B Vuong

(74) *Attorney, Agent, or Firm* — Dorsey & Whitney LLP

(57)         ABSTRACT

A shield box is provided for a toll transponder. The shield box may selectively shield thee toll transponder. The shield box may include a case that is securable to a vehicle windshield. At least a portion of the case may include a shielding material. The shield box may further include a tray configured to slide into and out of the case. The tray may support the toll transponder outside of the case and push the transponder toward a vehicle windshield to cause the toll transponder to make contact or be proximate with the vehicle windshield.

19 Claims, 11 Drawing Sheets

Towards
Windshield

Towards
Windshield

100

102

122

124

4

4

110

108

112

116

SLIDING TRANSPONDER SHIELD BOX

TECHNICAL FIELD

The present disclosure relates to a transponder holder, and more specifically to a device that may selectively control the operation of a vehicle transponder or onboard unit.

BACKGROUND

Electronic toll collection systems provide a way of managing traffic volume through toll collection points. Such systems typically include a reader at the toll station which interrogates a wireless payment device located on a vehicle. The payment device may be a wireless onboard unit or a transponder, such as an RFID (radio frequency identification device). The transponder is typically mounted on the windshield of the vehicle, and emits a signal that identifies that particular vehicle, user, or account.

The transponder communicates with an RF reader of a toll system. For example, when a vehicle equipped with a toll transponder approaches a toll plaza or gantry, the toll system's RF reader communicates with the transponder via radio waves. This interaction enables the identification of the vehicle and account associated with the transponder. The toll transponder plays a role in streamlining the toll collection process, as it eliminates the need for drivers to stop and pay in cash or swipe a card. Instead, the transponder transmits the necessary information to deduct the toll amount directly from the user's account, ensuring a more efficient and convenient experience for both drivers and toll operators.

In addition to being widely used for highway tolls, toll transponders are also employed in other applications, such as bridge tolls, express lanes, and parking facilities. Their reliable and automatic nature simplifies the overall toll collection process, reducing congestion and improving traffic flow on roadways.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figures 1A, 1B:
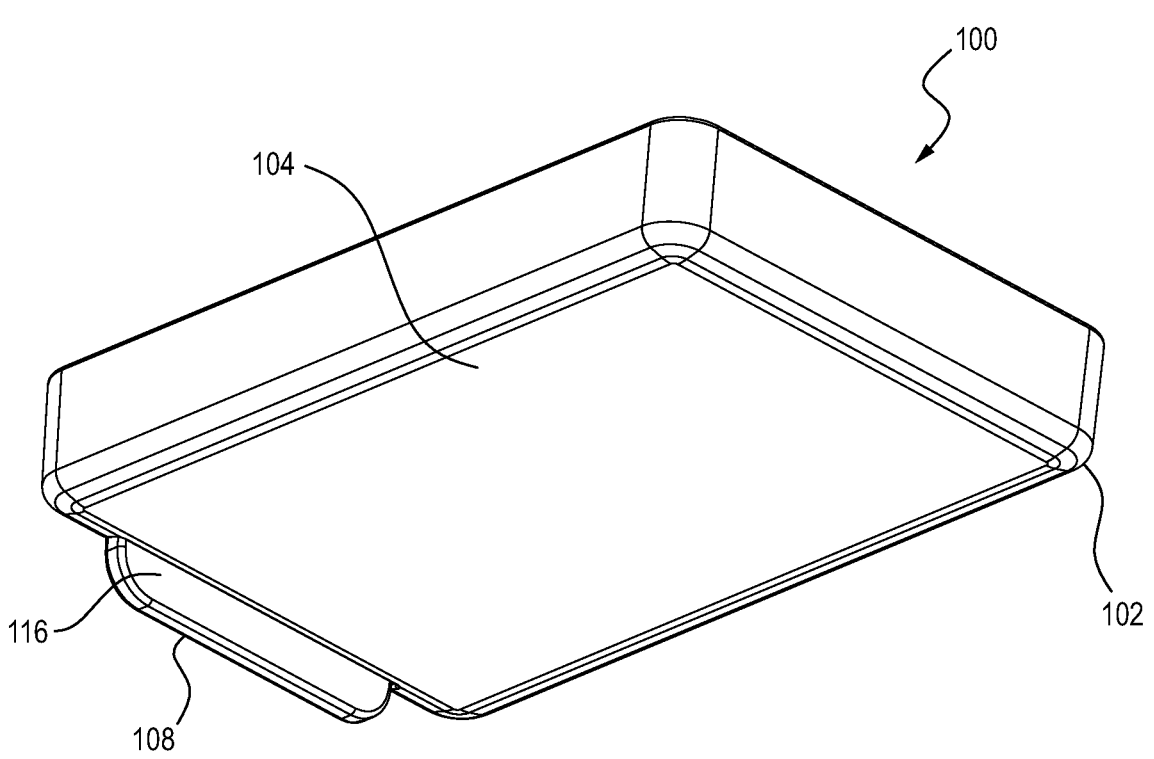
FIG. 1A illustrates a front perspective view of a shield box in a closed position in accordance with some embodiments.
FIG. 1B illustrates a rear perspective view of a shield box in a closed position in accordance with some embodiments.

Embodiments herein describe a sliding transponder shield box that may be used to selectively activate and deactivate a toll transponder. The sliding transponder shield box may include a tray configured to couple with a toll transponder and a case comprising shielding materials. The tray may slide into and out of the case to shift the transponder between a position in which the shield box encloses the transponder, and a position in which the transponder is exposed outside of the shield box. When the tray is slid into the case, the shielding material of the case may block wireless signaling between the transponder and a toll reader, thereby deactivating the transponder. The transponder may be considered activated when the tray is slid out of the case and the transponder is pushed up against the windshield by the sliding transponder box, thereby allowing wireless signaling between the transponder and the toll reader.

A toll transponder is a device used for electronic toll collection. It is typically mounted inside a vehicle, such as on the windshield or near the rear-view mirror, and communicates with toll collection systems to facilitate seamless payment of tolls. The transponder consists of various components, including a radio frequency identification (RFID) chip, an antenna, and internal circuitry. The RFID chip holds unique identification information associated with the registered user's account, while the antenna allows the transponder to transmit and receive signals.

For example, upon interrogation by a reader of a toll system, the transponder emits a radio frequency (RF) signal that includes information corresponding to an account code unique to the transponder. Based on the information from the transponder, the toll system can be properly charged for going through the toll. Accordingly, the toll transponder may eliminate the need for drivers to stop and pay in cash or swipe a card.

Some transponders have a form factor of an adhesive sticker (e.g., a peel-and-stick device). Instead of a bulky device that needs to be mounted inside a vehicle, a sticker transponder is designed to be easily affixed to the windshield or another specified location on the vehicle. To use a sticker transponder, the user peels the protective backing off the adhesive side of the sticker and attaches it to the designated area on the windshield or another specified location. Once properly attached, the sticker transponder is ready for use. Additionally, the efficacy of some transponders may be dependent on being near or in contact with the windshield.

However, there may be situations when the vehicle operator prefers not to have the transponder emit a signal to a toll system. At times it may be desirable for a driver of a vehicle to pay for the toll directly and not rely upon the payment device in the vehicle. For example, if the driver has rented the car from a rental company, the driver may prefer to pay the toll themselves as opposed to relying on the transponder provided with the rental car.

Furthermore, at times it may be desirable for the driver to selectively "turn off" the transponder in instances where the driver is not required to pay a toll (for example, in "high occupancy vehicle" situations). Removal of the transponder from the windshield may not feasible or practical. Compounding the issue is that for peel-and-stick transponder form factors removal from the windshield may damage the transponder and effectively destroy its transmission capabilities. Furthermore, at times a driver may want to transfer a transponder to another vehicle, which is difficult, if not impossible, when the transponder is of the peel-and-stick variety.

Accordingly, it would be preferable to be able to selectively activate and deactivate the transponder or be able to remove the transponder. Embodiments herein describe a sliding transponder shield box that may be used to selectively activate and deactivate a transponder. For instance, the sliding transponder shield box may couple with a RFID sticker transponder, and the RFID sticker transponder may be shifted between a position in which the shield box encloses the RFID sticker transponder, and a position in which the RFID sticker transponder is exposed outside of the shield box. The RFID sticker transponder is considered deactivated when it is enclosed within the shield box because the electromagnetic shielding properties of the shield box prevents signaling between the RFID sticker transponder and a transponder reader.

In some embodiments herein, the sliding transponder shield box may be capable of pressing the transponder against the windshield. For instance, the sliding transponder shield box may not only slides open, but it also move the transponder up and toward the vehicle windshield so that the sticker transponder makes contact with the vehicle windshield.

FIG. 1A illustrates a front perspective view of a shield box 100 in a closed position in accordance with some embodiments. FIG. 1B illustrates a rear perspective view of a shield box 100 in a closed position in accordance with some embodiments. The shield box 100 may be installed on a windshield of a vehicle, and may enable a user to determine when to use a transponder for a tolling service. For example, in a car rental scenario, renters can use a tolling service by opening the shield box 100 in the rented vehicle. Renters can refuse the tolling service by leaving the shield box 100 closed.

The shield box 100 may include a housing (e.g., case 102) and a tray 108. The transponder may be coupled to tray 108. The tray 108 may slide into and out of the case 102. The shield box 100 shields the RFID transponder when in a closed position preventing communication between RFID transponder and an RFID reader. At least a portion of the shield box 100 may be made of materials that prevent communication between the RFID transponder and the RFID reader. Such shielding material of the shield box 100 may include metals, carbons, ceramics, polymers, hybrids, or composites.

Figure 3:
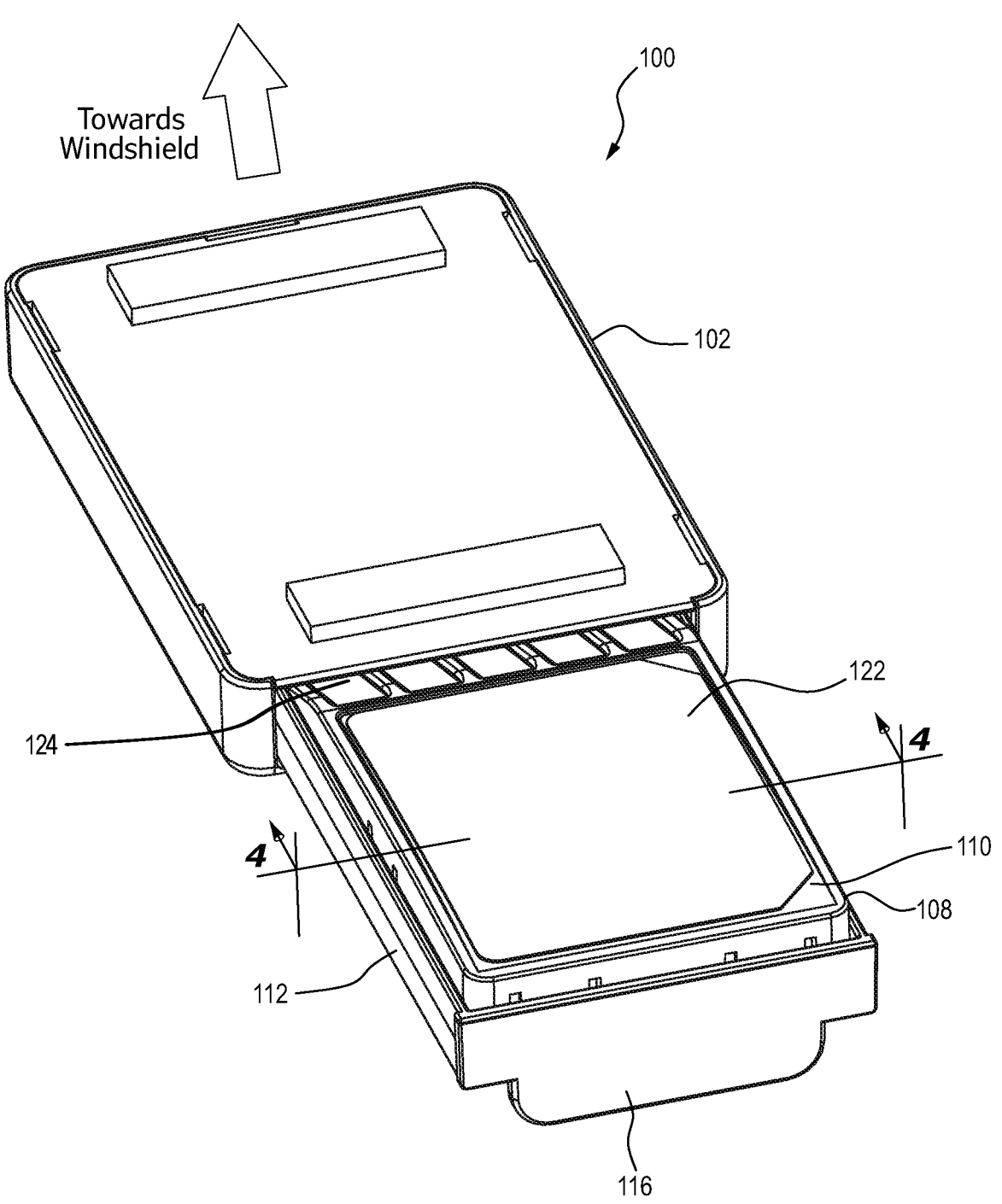
FIG. 3 illustrates a rear perspective view of a shield box in an open position in accordance with some embodiments.

When the shield box 100 is opened (e.g., as shown in FIG. 3), the tray is extended out of the case 102 such that the transponder 122 is outside of the case 102 allowing the transponder 122 to communicate with an RFID reader. Additionally, when in the open position, the shield box 100 may improve the transponder's RFID technology by pressing the transponder 122 to the vehicle windshield. The shield box 100 may be opened and closed manually by a user.

In some embodiments, the case 102 may be formed by coupling multiple pieces. For example, the case 102 may include a front panel 104 and a back panel 106. The front panel 104 and the back panel 106 may mate together to form an enclosure with an opening along one side. The tray 108 may slide in and out of the opening in the case 102. The front panel 104 may face a user when the shield box 100 is installed on a windshield. The back panel 106 may face toward the windshield when the shield box 100 is installed.

One or more adhesive strips 114 may be use to secure the back panel 106 to the windshield. The adhesive strips 114 may comprise, for example, a pre-mounted adhesive, such as a peel-and-stick foam tape, to attach the shield box 100 to the inside of the windshield or other part of the vehicle. Other means of fastening the shield box 100 to the vehicle may also be used, such as suction cups or hook-and-loop fasteners.

The tray 108 may include a handle 116 to assist a user in manipulating the position of the tray 108. The handle 116 of the tray may extend beyond the front panel 104 providing an overhang that a user may grasp. In some embodiments, the handle and an edge of the tray may align with a side of the case 102 when the shield box 100 is in the closed position. For instance, as shown in FIG. 1B, the tray 108 may be flush with the case 102.

The case 102 and tray 108 may be made of a molded plastic. In some embodiments, the shield box 100 may be made of a single material. For example, the case 102 and the tray 108 may both be made of a same shielding material. In some embodiments, the tray 108 may be made of a different material than the case 102. For instance, the tray 108 may be a non-shielding material and the case 102 may be made of a shielding material. In some embodiments, only a portion of the case 102 may be made of a shielding material. For example, the back panel 106 may be made of a shielding material and the tray 108 and the front panel 104 may be made of a non-shielding material.

The case 102 includes electromagnetic (EM) shielding material. The EM shielding materials may include carbon filaments. The carbon filaments may be formed into a matrix. In some embodiments, the carbon filaments may be combined with other resins to form the shield box 100 using plastic injection molding.

Figure 2:
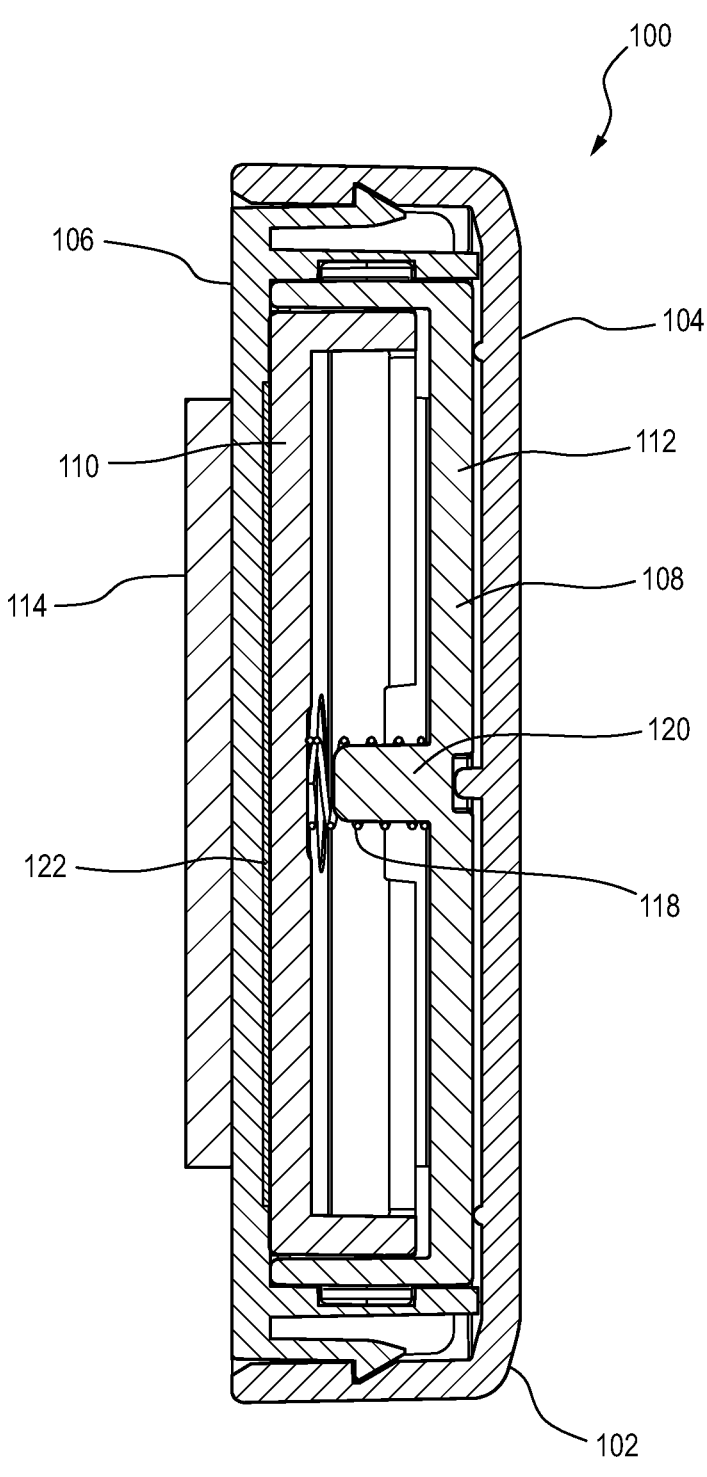
FIG. 2 illustrates a cross-sectional view of the shield box in a closed position in accordance with some embodiments.

FIG. 2 illustrates a cross-sectional view of the shield box 100 in a closed position in accordance with some embodiments. As shown, the tray 108 may include a platform 110 and a receptacle 112. The platform 110 may be configured to couple to a transponder 122. The transponder 122 may be a peel-and-stick transponder, and the platform 110 may include a flat area for the transponder to stick.

The receptacle 112 may include one or more posts 120. Each post 120 may retain a spring in a position between the platform 110 and the receptacle 112. The spring 118 may be oriented such that it provides a spring force against the platform 110. Accordingly, the spring 118 may bias the platform 110 away from the receptacle 112. The spring force may cause the platform 110 to extend away from the receptacle.

However, when in a closed position, as shown in FIG. 2, the back panel 106 retains the platform 110 in a collapsed state with the spring 118 compressed. As shown, in a collapsed state, the platform 110 may be forced to nest within the receptacle 112. In the collapsed state, the spring 118 is compressed such that when the shield box 100 is opened, the spring 118 forces the platform 110 outward toward the windshield.

For instance, FIG. 3 illustrates a rear perspective view of a shield box 100 in an open position in accordance with some embodiments. As shown, in the open position, the transponder 122 is exposed outside of the case 102. The tray 108 may slide out of the case 102 and the platform 110 may be biased to extend away from the receptacle 112 in a direction perpendicular to the direction in which the tray 108 slides. Thus, when the shield box 100 is opened, the platform 110 holding the sticker not only slides out of the case 102, but the platform 110 also moves up and toward the vehicle windshield so that the sticker transponder may make contact or be proximate with the vehicle windshield.

The windshield may act as an antenna to maximize the effectiveness of the RFID technology used in tolling operations. In order to improve the effectiveness of the windshield as an antenna, the platform 110 may be forced by one or more biasing elements (e.g., the springs 118) between the platform 110 and the receptacle 112 to extend and cause the transponder 122 to abut the windshield. The distance that the platform 110 can extend may be equal to or greater than the thickness of the back panel 106 and the adhesive strips 114.

The transponder 122 may be affixed to a platform 110 which slides into and out of the case 102 in such a way that the transponder 122 is not damaged after repeated openings and closings. In the case of a stick-and-peel transponder, the platform 110 may include a recessed area to prevent the transponder 122 from catching on an opening edge of the case 102. Additionally, a ramp 124 of the platform 110 may engage the opening edge of the case 102 to prevent the case 102 from catching on the transponder 122 when the tray 108 is pushed back into the case 102.

Figure 4:
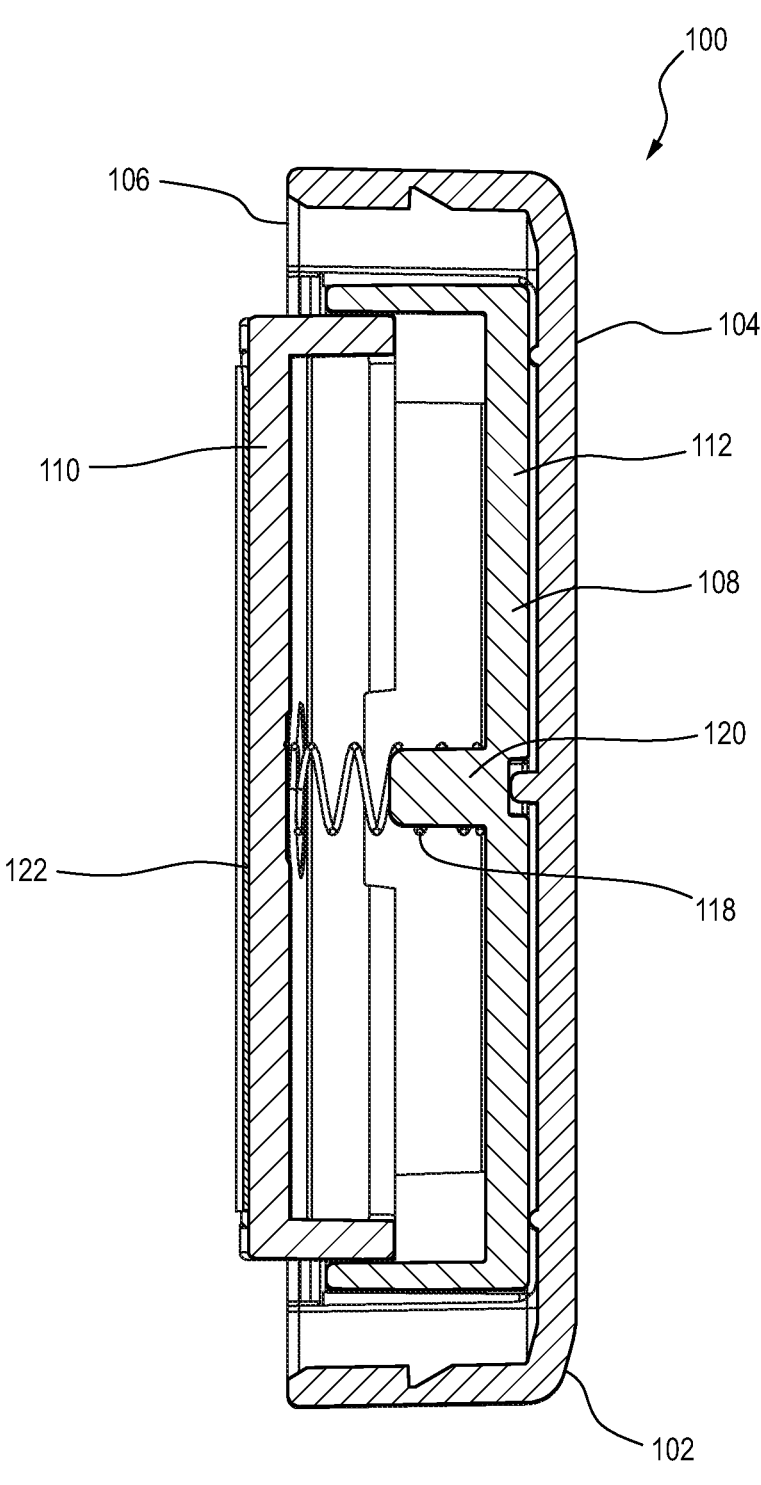
FIG. 4 illustrates a cross-sectional view of the shield box in an open position in accordance with some embodiments.

FIG. 4 illustrates a cross-sectional view of the shield box 100 in an open position in accordance with some embodiments. As shown, when in the open position, the platform 110 may be at least partially out of the case 102, and the platform 110 may extend beyond the back panel 106 that was retaining the platform 110 in place. Accordingly, the springs 118 between the platform 110 and the receptacle 112 may provide a spring force that causes the platform 110 to extend away from the receptacle 112. The receptacle 112 may be held in place by the case 102 causing the platform 110 to extend past the case 102 and cause the transponder 122 to make contact with a vehicle windshield.

A user, such as a vehicle operator, may selectively change the shield box 100 from the open position to the closed position, and from the closed position to the open position, to control the operation of the transponder 122. In the open position, the transponder 122 is operable to communicate wirelessly with an external device, such as a transponder reader at an automatic toll collection booth or along an HOV lane. In the closed position, the transponder 122 is unable to communicate with the external device. In certain embodiments, the transponder 122 is completely enclosed (i.e., on all sides) within the shield box 100 in the closed position. The transponder 122 may provide one-way or two-way short-range to medium-range wireless communication with the external device. By way of example, the transponder 122 may use dedicated short-range communications (DSCR) to communicate with the external device. The platform 110 abuts a surface of the transponder 122 to a vehicle windshield when the shield box 100 is in the open position.

The tray 108 may be slid relative to the case 102 to transition between an open position and a closed position. When the tray 108 and the case 102 are in the closed configuration, the case 102 may enclose the transponder 122 preventing wireless communication signals from the transponder 122 from being sent to an external device. When the tray 108 and the case 102 are in the open configuration the transponder 122 is pushed against the windshield and is unobstructed by the case 102.

Figure 5:
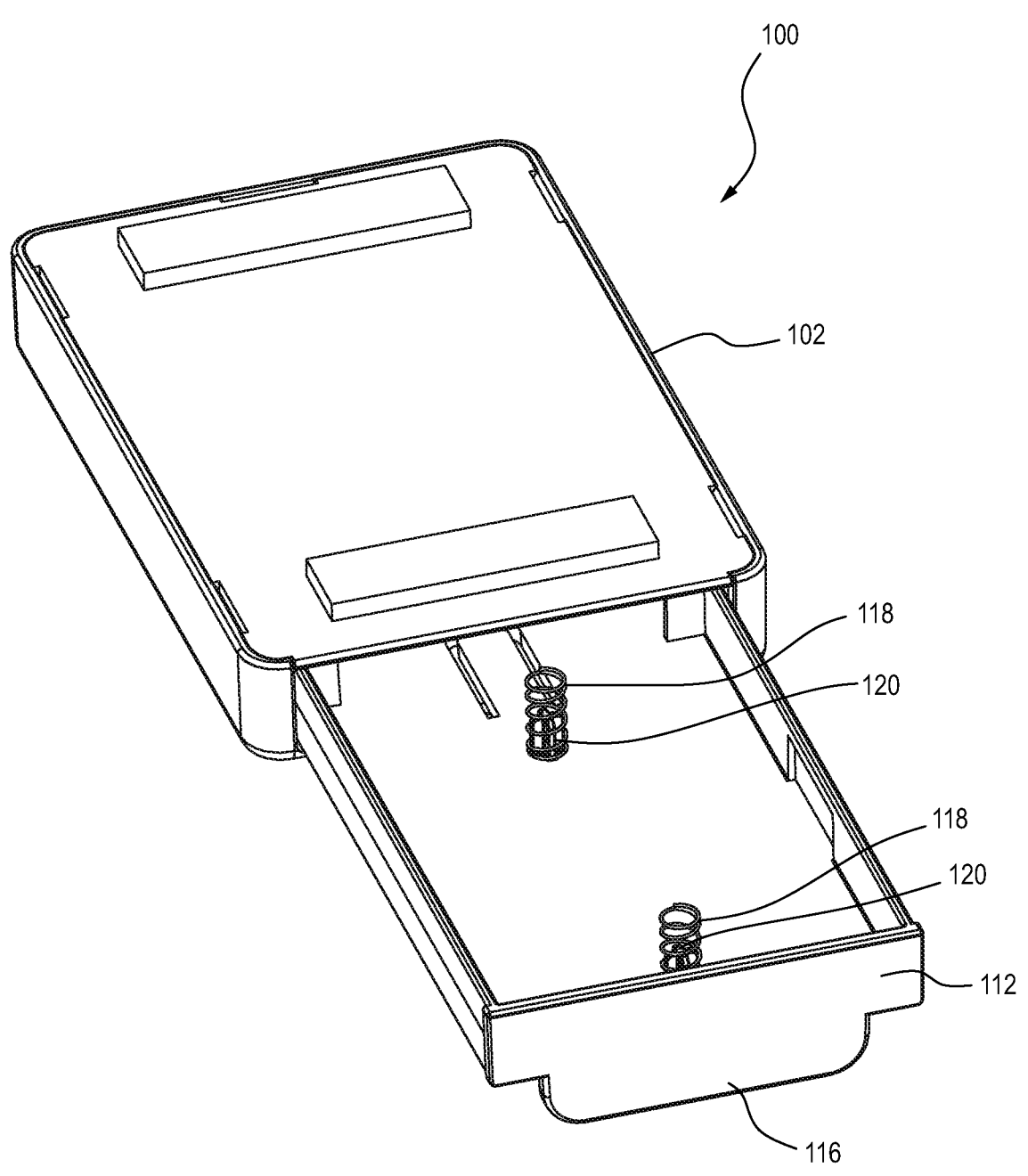
FIG. 5 illustrates a rear perspective view of a shield box in an open position with the platform removed in accordance with some embodiments.

FIG. 5 illustrates a rear perspective view of a shield box 100 in an open position with the platform 110 removed in accordance with some embodiments. As shown, the receptacle 112 may include two posts 120. A first post may be centered along a width of the receptacle 112 and positioned near the handle 116. A second post may be located in line with the first post (e.g., centered along a width of the receptacle) at a second position further from the handle 116.

The posts 120 may maintain the position of springs 118. The posts 120 may have a diameter similar to the diameter of the springs 118. The springs 118 may be formed with the receptacle 112 as a single post or may be attached to the receptacle 112. For instance the receptacle 112 and the posts 120 may be formed as a single piece through injection molding. The material of the receptacle 112 may be injected into a mold cavity the shape of the receptacle 112 with the posts. The material solidifies and takes the shape of the cavity, resulting in the receptacle 112 with posts 120.

The free length of the springs 118 may be sufficient to cause the platform 110 to extend beyond the back panel 106 and adhesive strips 114 when the shield box 100 is not secured to a windshield. The springs 118 may provide a force perpendicular to the direction of travel of the receptacle 112. When the shield box 100 is in the closed position the springs 118 are compressed and store mechanical energy that is then released when the shield box 100 transitions to the open position.

Figure 6:
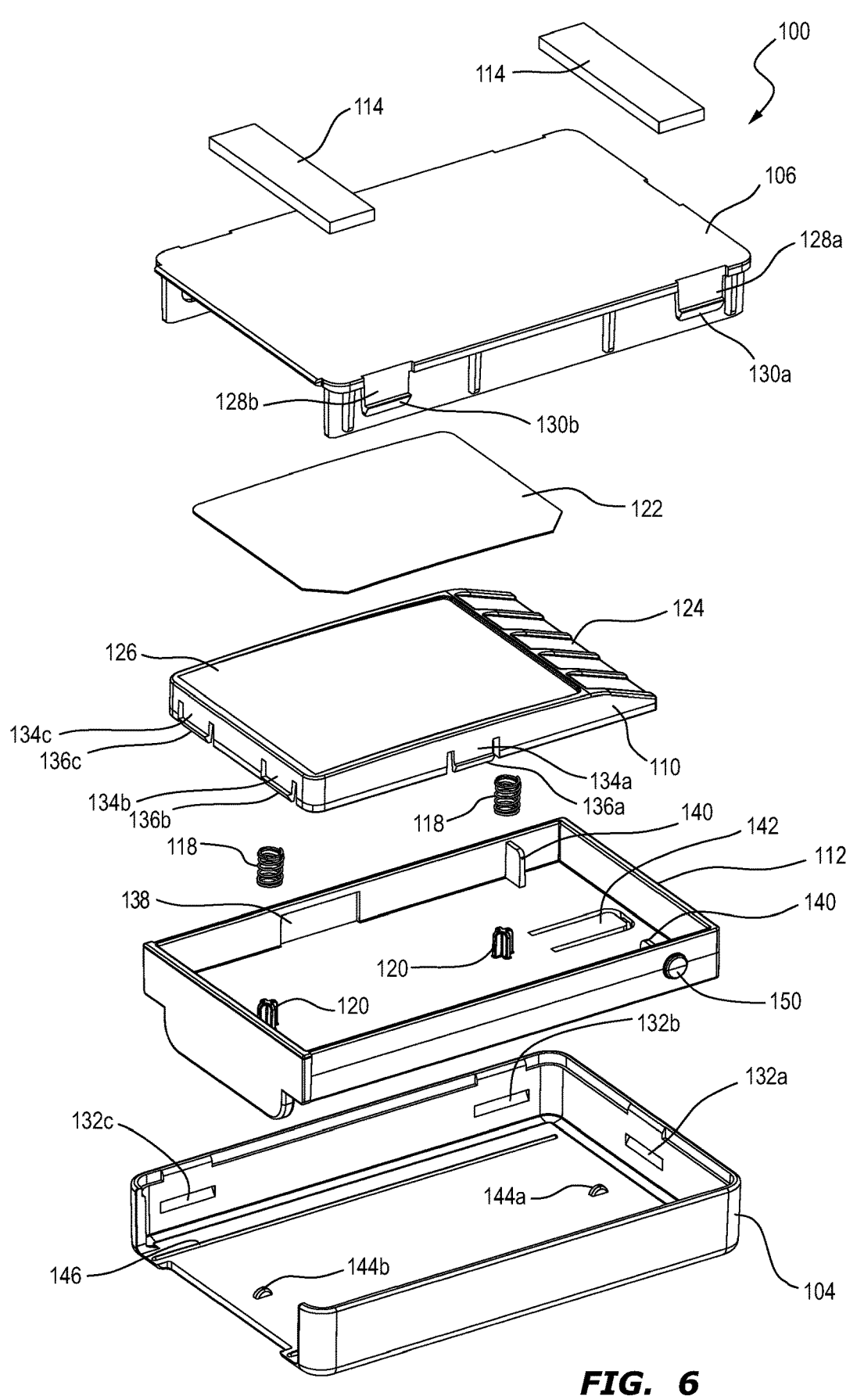
FIG. 6 illustrates an exploded view of a shield box in accordance with some embodiments.

FIG. 6 illustrates an exploded view of a shield box 100 in accordance with some embodiments. The adhesive strips 114 may couple with the back panel 106. In some embodiments, the adhesive strips 114 may be a double-sided adhesive strip that offers bonding capabilities on both sides. The adhesive strips 114 may couple to the back panel 106 and a windshield to provide a strong and reliable bond to secure the shield box 100. The adhesive strips 114 may comprise a thin, flexible material, such as foam, film, or paper, and be coated with adhesive on both sides.

The back panel 106 and the front panel 104 may be coupled, for example, using one or more snap joints. A snap joint is a mechanical connection method used to join two components or parts together by means of interlocking mechanisms. It involves the use of specific features or structures designed to securely lock or snap into place, creating a reliable and durable connection. A snap joint typically consists of two components: a male or protruding side, and a female or receiving side. The male side may feature one or more protrusions or tabs, while the female side has corresponding slots, holes, or recesses to accommodate and engage with the protrusions.

For example, in the illustrated embodiment, the back panel 106 includes four cantilevers or tabs near each corner (e.g., cantilever 128a and cantilever 128b) and a cantilever on the side opposite of the opening of the case. The cantilevers may be capable of flexing when the back panel 106 is pressed into the front panel 104. On each of the cantilevers is a hook (e.g., hook 130a and hook 130c). The hooks protrude outward from the cantilevers. The front panel 104 includes a mating set of detents or slots (e.g., detent 132a, detent 132b, and detent 132c) that provide a recess to accommodate and engage the hooks.

To assemble the snap joints of the front panel 104 and back panel 106, the hooks are aligned with the detents. The hooks are inserted into the detents by pushing the back panel 106 and the front panel 104 together. As the back panel 106 and the front panel 104 are pushed together, the hooks snap into place in the detents, creating a positive and secure lock. The snap joints offer several advantages. For example, they provide ease of assembly, allowing for quick and efficient joining of parts without the need for additional tools or fasteners.

The transponder 122 may be a peel-and-stick transponder with an adhesive back to secure it to the platform 110. A sticker toll transponder (e.g., transponder 122) is a small electronic device that is typically affixed to the windshield or any designated location inside a vehicle to facilitate automated toll collection. The sticker toll transponder is typically a thin, adhesive-backed device that incorporates radio frequency identification (RFID) technology. It contains a microchip that stores relevant vehicle and account information, as well as an antenna for communication with toll collection infrastructure. When a vehicle equipped with a sticker toll transponder approaches a toll plaza, the transponder communicates wirelessly with the toll collection system. The system recognizes the transponder's unique identifier and deducts the appropriate toll amount from the associated account.

However, rather the placing the transponder 122 on the windshield, the illustrated embodiment secures the transponder 122 to the platform 110. As shown, the platform 110 may include a recess 126. The recess 126 may provide guidance for transponder 122 placement. Additionally, the recess 126 may prevent the edges of the transponder 122 from damage during opening and closing of the shield box 100. The recess 126 may be a depth equivalent to or less than the thickness of the transponder 122.

The platform 110 may also include a ramp 124. The ramp 124 may engage with an edge of an opening of the case 102 (e.g., an edge on the back panel 106). As the tray 108 is pushed into the case 102, the ramp 124 will provide a gradual compression force on the springs 118. Causing the platform 110 to collapse into the receptacle 112.

As shown, the platform 110 and receptacle 112 may also be coupled via a series of snap joints. For example, platform 110 may include a series of cantilevers (e.g., cantilever 134a, cantilever 134b, and cantilever 134c) with hooks (e.g., hook 136a, hook 136b, and hook 136c). The cantilevers may flex inward when the platform 110 is pushed into the receptacle 112 and the cantilevers contact the walls of the 112 until the hooks engage with the matting slots (e.g., slot 138) of the receptacle 112.

The slots of the receptacle 112 may be sized and shaped to allow the hooks of the platform 110 to move up and down. For instance, as show, the slots may have a greater length than the height of the hooks. The hooks may therefore slide up to the end of the slots. The end of the slots may provide a stop preventing the platform 110 from releasing completely from the receptacle 112. This snap joint that allows movement of the hooks may be referred to as a loose snap joint. The receptacle 112 may also include stops 140 to prevent the platform 110 from sliding in a direction perpendicular to the force from the springs 118.

The receptacle 112 may also include a tab 142. The tab 142 may be formed by having a portion of a portion of the receptacle 112 be disconnected from the rest of the receptacle 112 on three sides. The tab 142 may provide physical feedback in the form of a click when it engages with protrusion 144a and protrusion 144b on the front panel 104. The engagement points may be referred to as click points and may indicate to the user that the shield box is open all the way or closed all the way. The click points may also prevent the tray 108 from sliding into and out of the case 102 without user supplied force.

The receptacle 112 may be configured to slide relative to the front panel 104 and back panel 106. The receptacle 112 may include a guide pin (e.g., guide pin 150) on two opposing sides that may slidably engage with a channel on the back panel 106. The front panel 104 may include rails 146. The rails 146 may provide a surface for the receptacle 112 to slide on. The rails 146 may provide a reduction in friction area between the front panel 104 and the receptacle 112.

Figures 7A, 7B:
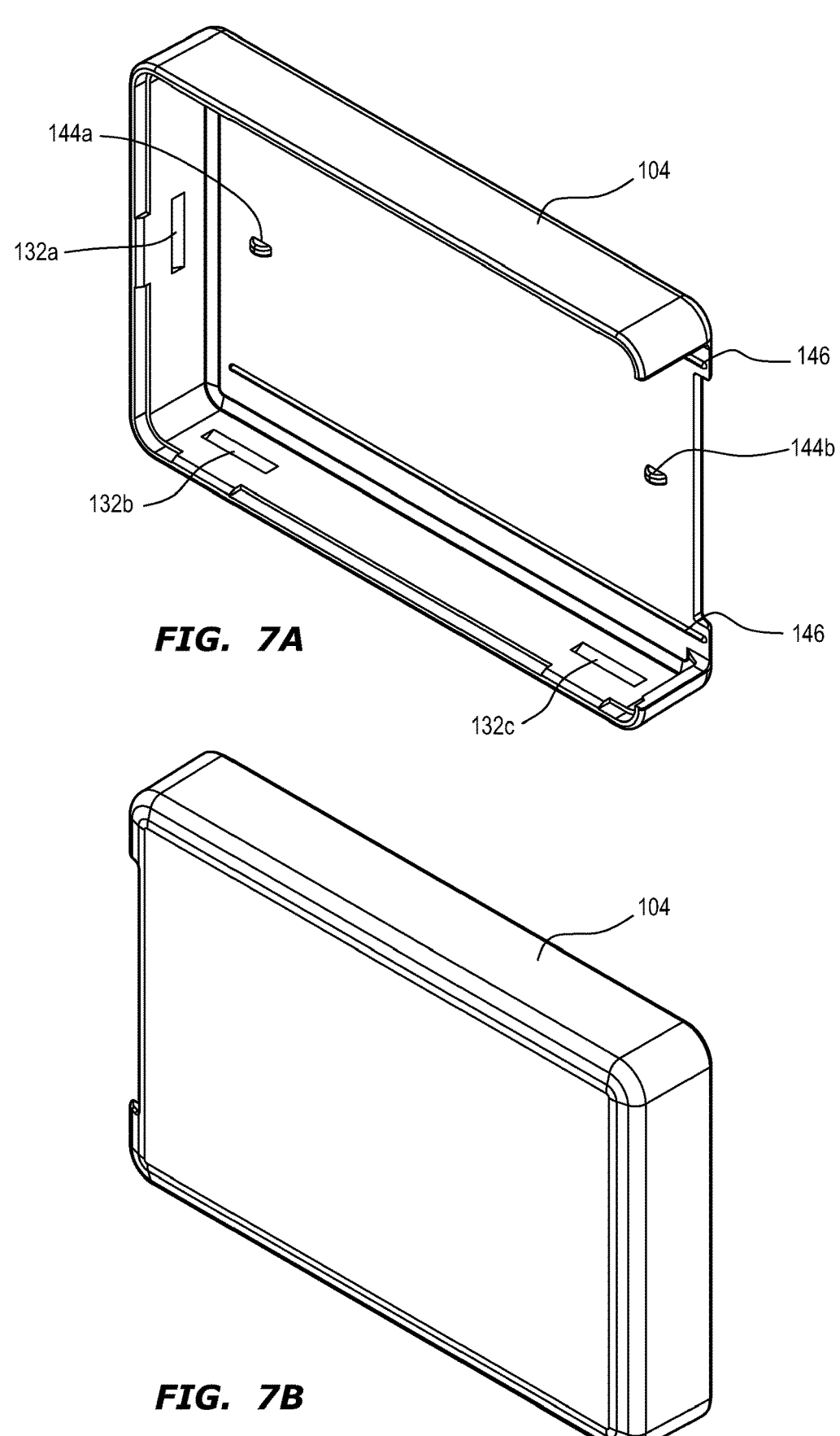
FIG. 7A illustrates a rear perspective view of a front panel in accordance with some embodiments.
FIG. 7B illustrates a front perspective view of a front panel in accordance with some embodiments.

FIG. 7A illustrates a rear perspective view of a front panel 104 in accordance with some embodiments. FIG. 7B illustrates a front perspective view of a front panel 104 in accordance with some embodiments. As shown, the front panel 104 may include a planar wall coupled to a first perimeter wall, a second perimeter wall, and a third perimeter wall. The planar wall may cover a transponder along a first planar side and the perimeter walls may cover a transponder along three edges. An opening may be left for a tray (e.g., tray 108) to slide into and out of.

In some embodiments, the front panel 104 may include two rails 146. The two rails 146 may extend along a majority of a length of the front panel 104, and may be located near opposing perimeter walls. The rails 146 may be raised portions of the front panel 104. The rails 146 may provide a surface for the tray 108 to slide on. The rails 146 may be molded with the rest of the front panel 104 as a singular piece.

In some embodiments, the front panel 104 includes a set of detents (e.g., detent 132a, detent 132b, and detent 132c) that provide a recess to accommodate and engage mating hooks of the back panel. The detents may be slots sized and shaped to form a secure snap fit with the hooks of the back panel.

In some embodiments, the front panel 104 may include two interior protrusions (e.g., protrusion 144a and protrusion 144b). The protrusions may be formed during molding of the front panel 104. The protrusions may provide a first click point when a tray 108 slides into a first position and a second click point when a tray 108 slides into a second position. The protrusions may also prevent the tray 108 from sliding when it is in either of the two positions without user supplying additional force.

Figures 8A, 8B:
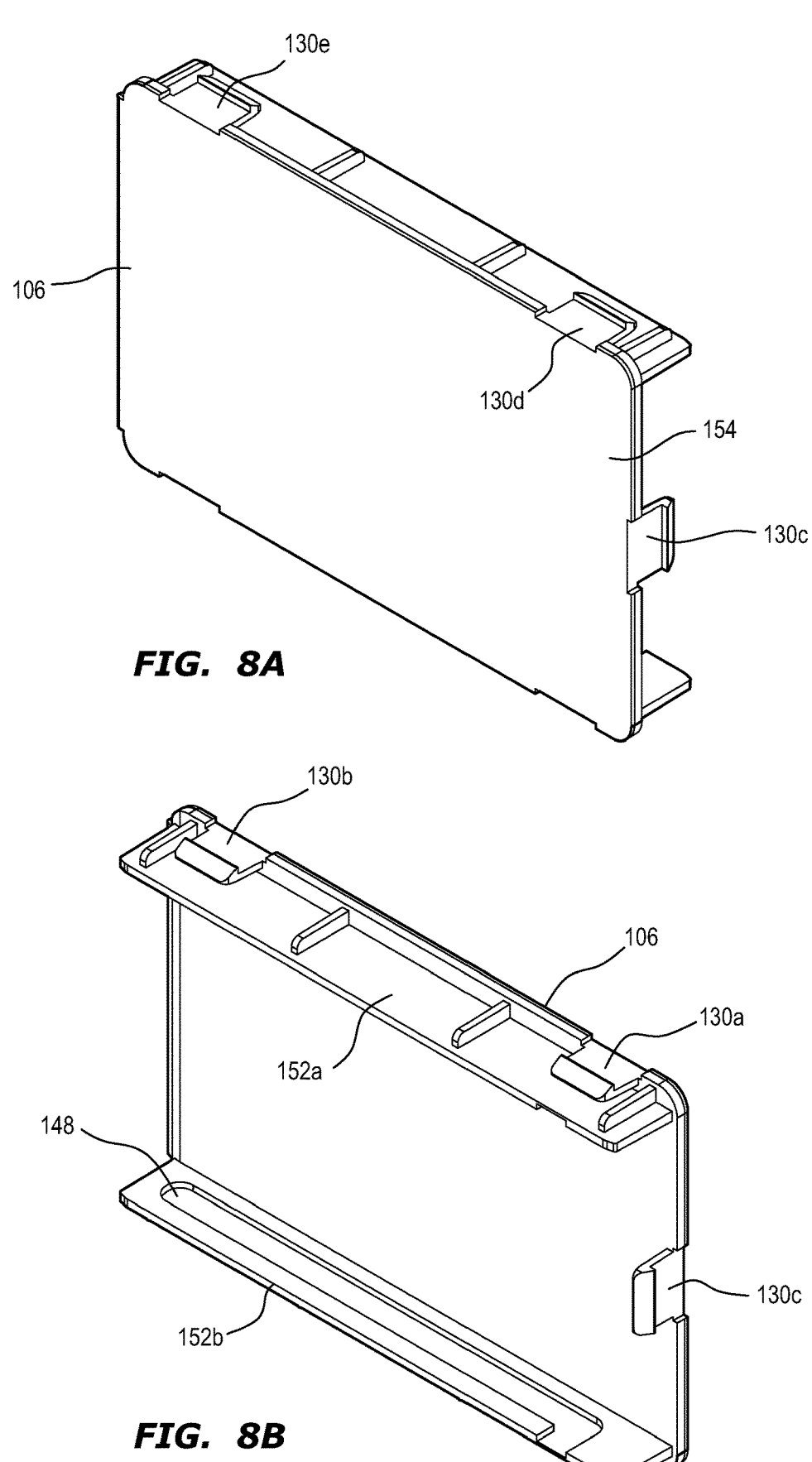
FIG. 8A illustrates a rear perspective view of a back panel in accordance with some embodiments.
FIG. 8B illustrates a front perspective view of a back panel in accordance with some embodiments.

FIG. 8A illustrates a rear perspective view of a back panel 106 in accordance with some embodiments. FIG. 8B illustrates a front perspective view of a back panel 106 in accordance with some embodiments. As shown, the back panel 106 may include a planar wall 154 coupled to a first perimeter wall 152a, a second perimeter wall 152b. The planar wall 154 may cover a transponder along a planar side and the perimeter walls may cover a transponder along two opposing edges.

The perimeter walls may be inset from an edge of the planar wall 154 such that the perimeter walls may be inserted between the walls of the front panel 104. The planar wall 154 of the back panel 106 may overhang the perimeter walls. The overhang of the planar wall 154 may abut with the walls of the front panel 104 when they are connected using the snap joints. As shown, the back panel 106 may include one or more cantilevers and hooks (e.g., hook 130a, hook 130c, and hook 130c) on each side except for the side where the opening of the case 102 is located.

Both of the perimeter walls may include a series of ribs that may provide strength and rigidity to the walls. Additionally, both of the perimeter walls may include a channel

148 that a guide pin 150 of a tray 108 may slide in. As shown, the channel may include an opening that allows a tray to be inserted during assembly. The opening may be blocked when the back panel 106 and the front panel 104 are coupled.

Figure 9A:
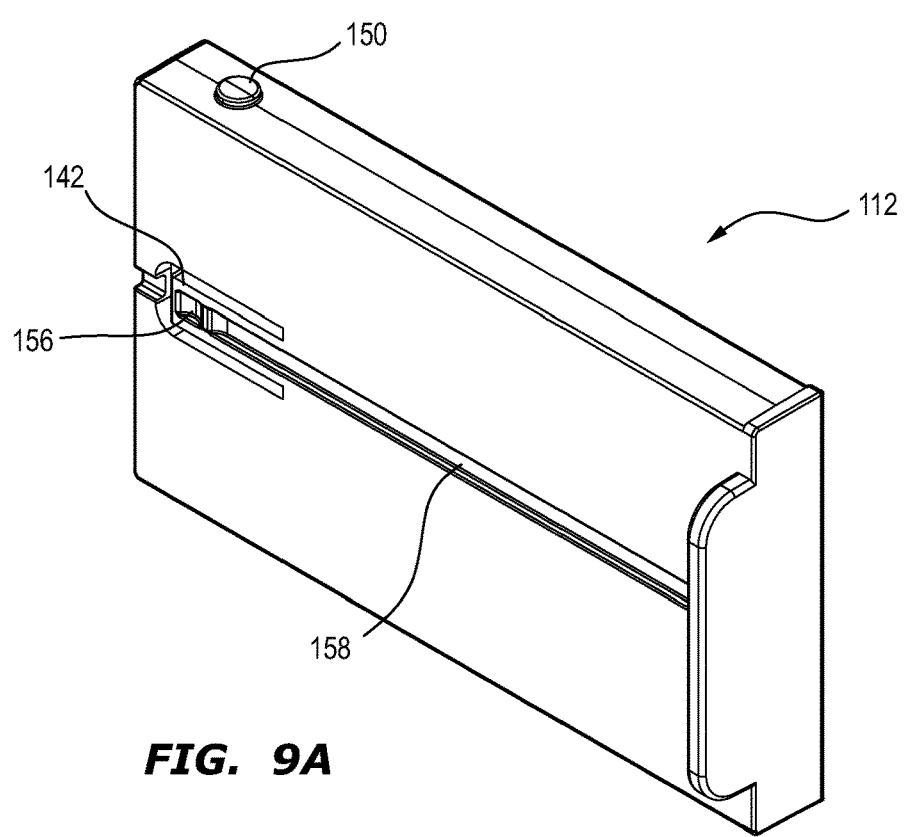
FIG. 9A illustrates a first perspective view of a receptacle in accordance with some embodiments.
Figure 9B:
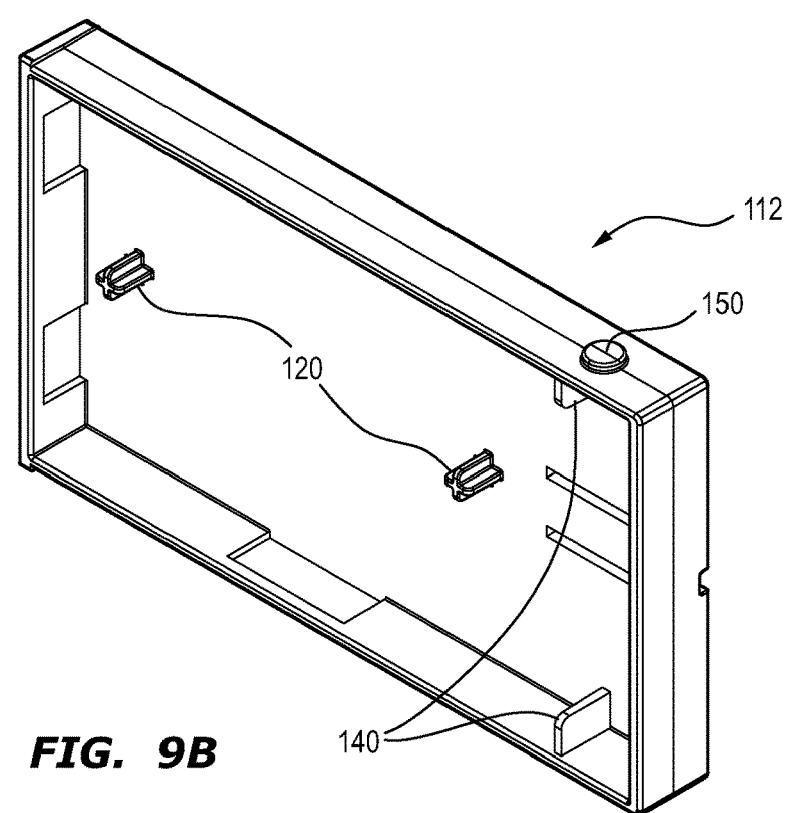
FIG. 9B illustrates a second perspective view of a receptacle in accordance with some embodiments.

FIG. 9A illustrates a first perspective view of a receptacle 112 in accordance with some embodiments. FIG. 9B illustrates a second perspective view of a receptacle 112 in accordance with some embodiments. The receptacle 112 forms a container that may receive a platform 110. As previously discussed, the receptacle 112 may include a guide pin 150. There may be a guide pin 150 on opposing sides of the receptacle 112 that may slide within the channel 148 of the back panel 106. Additionally, the receptacle 112 may include posts 120 to retain the springs 118 and stops 140 to prevent lateral movement of the platform 110.

In some embodiments, the receptacle 112 may include a track 158. The track may be configured to receive and slide along the protrusion 144b of the front panel 104. The track 158 may extend along the length of the receptacle 112 and end at the tab 142. At the end of the track may be a detent 156 that provides an engagement point for the protrusions (e.g., protrusion 144a and protrusion 144b) of the front panel 104.

Figure 10A:
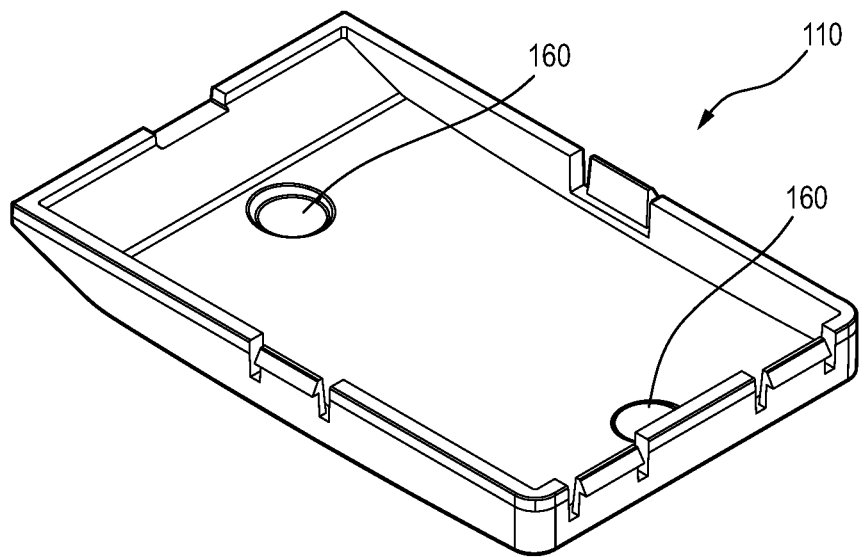
FIG. 10A illustrates a first perspective view of a platform in accordance with some embodiments.
Figure 10B:
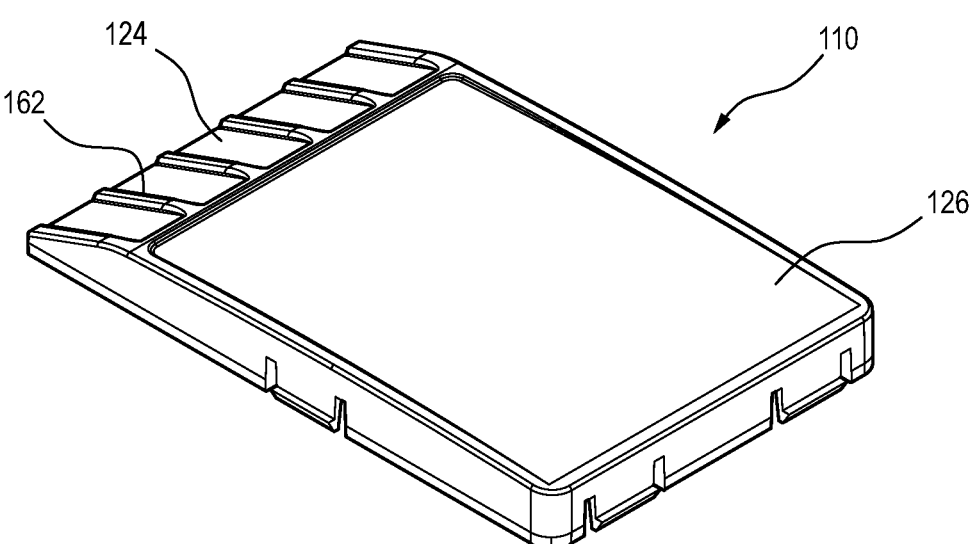
FIG. 10B illustrates a second perspective view of a platform in accordance with some embodiments.

FIG. 10A illustrates a first perspective view of a platform 110 in accordance with some embodiments. FIG. 10B illustrates a second perspective view of a platform 110 in accordance with some embodiments. As shown, the platform 110 may include a recess 126 to provide a location for securing a sticker transponder. Additionally, the platform 110 may include a ramp 124 to engage with an opening edge of the case 102 as the tray 108 is slid into and out of the case 102. The ramp 124 may include a set of ridges that may reduce the amount of surface contact the edge of the case 102 has with the ramp 124. The ridges 162 may also be raised to prevent the edge of the case 102 from peeling an edge of the transponder 122 from the platform 110. In some embodiments, the platform 110 may include indents 160 that may provide a contact area with the springs 118. The indents 160 may keep the position of the springs in that area preventing the spring 118 from sliding along the interior surface of the platform.

Figure 11:
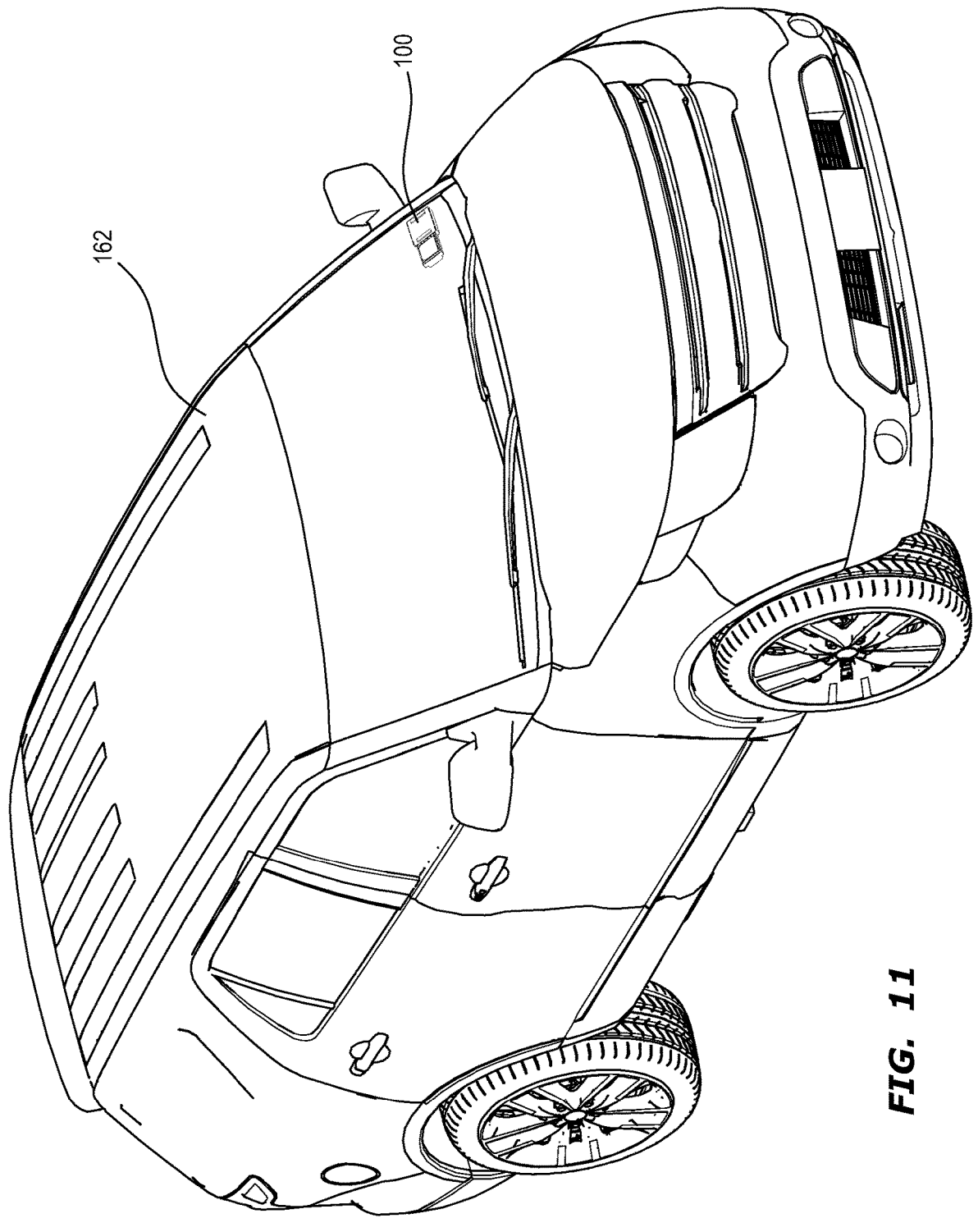
FIG. 11 illustrates a shield box installed on a windshield of a vehicle in accordance with some embodiments.

FIG. 11 illustrates a shield box 100 installed on a windshield of a vehicle 164 in accordance with some embodiments. In the illustration, the shield box 100 is in an open position. In the open position, the tray of the shield box 100 supports the transponder outside of the case and pushes the transponder toward the vehicle windshield to cause the transponder to make contact with the vehicle windshield. The tray may be configured to expand when it is slid out of the opening of the case and collapse when the tray is slid into the opening case.

Some embodiments herein include an apparatus for retaining and selectively shielding a transponder. In some embodiments, the apparatus comprises a case securable to a vehicle windshield, at least a portion of the case comprising a shielding material, and a tray slidably coupled to the case and configured to couple to a transponder. In some embodiments, the tray is configured to slide between a first position and a second position relative to the case. In some embodiments, the tray is configured to enclose the transponder within the case when the tray is in the first position, and the tray is extended out of the case in a first direction, and is configured to extend the transponder in a second direction perpendicular to the first direction when the tray is in the second position. The second direction is toward the vehicle windshield.

In some embodiments, the tray comprises a receptacle configured to slidably engage with the case, a platform configured to couple to the transponder, the platform configured to engage with the receptacle, and one or more biasing elements between the receptacle and the platform that provide a force to bias the platform away from the receptacle.

In some embodiments, the platform and the receptacle engage via a snap joint, the snap joint comprising a hook on the platform and a slot on the receptacle, the slot sized and shaped to allow the hook to slide up to an end of the slot.

In some embodiments, the platform comprises a ramp that engages with an edge of the case to provide a compression force when the tray is moved from the second position to the first position.

In some embodiments, the ramp comprises a set of ridges that provide contact surfaces with the edge of the case.

In some embodiments, the platform includes a recess sized and shaped to receive the transponder.

In some embodiments, when in the second position, the tray supports the transponder outside of the case and pushes the transponder toward the vehicle windshield to cause the transponder to make contact with the vehicle windshield.

In some embodiments, the case further comprises two interior protrusions, and the tray comprises a detent that selectively engages with the two interior protrusions to provide a first click point when the tray slides into the first position and a second click point when the tray slides into the second position.

Some embodiments herein include apparatus for retaining and selectively shielding a transponder. In some embodiments, the apparatus comprises a case securable to a vehicle windshield, at least a portion of the case comprising a shielding material, and a tray. The tray may comprise a receptacle configured to slidably engage with the case, a platform configured to couple to the transponder and to engage with the receptacle, and one or more biasing elements between the receptacle and the platform that provide a force to bias the platform away from the receptacle.

In some embodiments, the tray is configured to slide between a first position and a second position relative to the case, when in the first position, the platform is within the case, and when in the second position, the tray is extended out of the case in a first direction, and the platform is biased to extend in a second direction perpendicular to the first direction.

In some embodiments, when in the second position, the tray supports the transponder outside of the case and pushes the transponder toward the vehicle windshield to cause the transponder to make contact with the vehicle windshield.

In some embodiments, the platform comprises a ramp that engages with an edge of the case to provide a compression force when the tray is moved from the second position to the first position.

In some embodiments, the case further comprises two interior protrusions, and the tray comprises a detent that selectively engages with the two interior protrusions to provide a first click point when the tray slides into the first position and a second click point when the tray slides into the second position.

In some embodiments, the platform and the receptacle engage via a snap joint, the snap joint comprising a hook on the platform and a slot on the receptacle, the slot sized and shaped to allow the hook to slide up to an end of the slot.

In some embodiments, the ramp comprises a set of ridges that provide contact surfaces with the edge of the case.

In some embodiments, the platform includes a recess sized and shaped to receive the transponder.

Some embodiments herein include a shield box apparatus comprising a housing and a tray. The housing is securable to a vehicle windshield, the housing comprising a front panel and a back panel coupled together to form an enclosure with an opening along one side. The tray is configured to slide in and out of the opening of the housing and couple to a transponder. In some embodiments, the tray is configured to extend toward the vehicle windshield when the tray is slid out of the opening of the housing and collapse when the tray is slid into the opening.

In some embodiments, the tray comprises a receptacle configured to slidably engage with the housing; a platform configured to couple to the transponder and to engage with the receptacle; and one or more biasing elements between the receptacle and the platform, wherein the one or more biasing elements expand the tray by extending the platform away from the receptacle and toward the vehicle windshield when secured to the vehicle windshield.

In some embodiments, the tray supports the transponder outside of the case and pushes the transponder toward the vehicle windshield to cause the transponder to make contact with the vehicle windshield.

In some embodiments, the platform comprises a ramp that engages with an edge of the opening of the housing to provide a compression force when the tray is slid into the opening of the housing.

Reference throughout this specification to an "embodiment" means that a particular feature, structure, or characteristic described in connection with that embodiment is included in at least one embodiment. Thus, references to embodiments throughout this specification are not necessarily all referring to the same embodiment.

Similarly, it should be appreciated by one of skill in the art with the benefit of this disclosure that in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having skill in the art that changes may be made to the details of the above-described embodiments without departing from the underlying principles of the present disclosure.

What is claimed is:

1. An apparatus for retaining and selectively shielding a transponder, the apparatus comprising:
a case securable to a vehicle windshield, at least a portion of the case comprising a shielding material; and
a tray slidably coupled to the case and configured to couple to a transponder, wherein
the tray is configured to slide between a first position and a second position relative to the case, the tray is configured to enclose the transponder within the case when the tray is in the first position, and
the tray is extended out of the case in a first direction, and is configured to extend the transponder in a second direction perpendicular to the first direction when the tray is in the second position, the second direction being toward the vehicle windshield.

2. The apparatus of claim 1, wherein the tray comprises:
a receptacle configured to slidably engage with the case;
a platform configured to couple to the transponder, the platform configured to engage with the receptacle; and
one or more biasing elements between the receptacle and the platform that provide a force to bias the platform away from the receptacle.

3. The apparatus of claim 2, wherein the platform and the receptacle engage via a snap joint, the snap joint comprising a hook on the platform and a slot on the receptacle, the slot sized and shaped to allow the hook to slide up to an end of the slot.

4. The apparatus of claim 2, wherein the platform comprises a ramp that engages with an edge of the case to provide a compression force when the tray is moved from the second position to the first position.

5. The apparatus of claim 4, wherein the ramp comprises a set of ridges that provide contact surfaces with the edge of the case.

6. The apparatus of claim 2, wherein the platform includes a recess sized and shaped to receive the transponder.

7. The apparatus of claim 1, wherein when in the second position, the tray supports the transponder outside of the case and pushes the transponder toward the vehicle windshield to cause the transponder to make contact with the vehicle windshield.

8. The apparatus of claim 1, wherein the case further comprises two interior protrusions, and
the tray comprises a detent that selectively engages with the two interior protrusions to provide a first click point when the tray slides into the first position and a second click point when the tray slides into the second position.

9. An apparatus for retaining and selectively shielding a transponder, the apparatus comprising:
a case securable to a vehicle windshield, at least a portion of the case comprising a shielding material; and
a tray comprising:
a receptacle configured to slidably engage with the case;
a platform configured to couple to the transponder and to engage with the receptacle; and
one or more biasing elements between the receptacle and the platform that provide a force to bias the platform away from the receptacle.

10. The apparatus of claim 9, wherein the tray is configured to slide between a first position and a second position relative to the case,
when in the first position, the platform is within the case, and
when in the second position, the tray is extended out of the case in a first direction, and the platform is biased to extend in a second direction perpendicular to the first direction.

11. The apparatus of claim 10, wherein when in the second position, the tray supports the transponder outside of the case and pushes the transponder toward the vehicle windshield to cause the transponder to make contact with the vehicle windshield.

12. The apparatus of claim 10, wherein the platform comprises a ramp that engages with an edge of the case to provide a compression force when the tray is moved from the second position to the first position.

13. The apparatus of claim 12, wherein the ramp comprises a set of ridges that provide contact surfaces with the edge of the case.

14. The apparatus of claim 10, wherein the case further comprises two interior protrusions, and the tray comprises a detent that selectively engages with the two interior protrusions to provide a first click point when the tray slides into the first position and a second click point when the tray slides into the second position.

15. The apparatus of claim 9, wherein the platform and the receptacle engage via a snap joint, the snap joint comprising a hook on the platform and a slot on the receptacle, the slot sized and shaped to allow the hook to slide up to an end of the slot.

16. The apparatus of claim 9, wherein the platform includes a recess sized and shaped to receive the transponder.

17. A shield box apparatus comprising:

a housing securable to a vehicle windshield, the housing comprising a front panel and a back panel coupled together to form an enclosure with an opening along one side; and a tray configured to slide in and out of the opening of the housing and couple to a transponder, wherein the tray is configured to extend toward the vehicle windshield when the tray is slid out of the opening of the housing and collapse when the tray is slid into the opening, wherein the tray comprises:

a receptacle configured to slidably engage with the housing;

a platform configured to couple to the transponder and to engage with the receptacle; and one or more biasing elements between the receptacle and the platform, wherein the one or more biasing elements expand the tray by extending the platform away from the receptacle and toward the vehicle windshield when secured to the vehicle windshield.

18. A shield box apparatus comprising:

a housing securable to a vehicle windshield, the housing comprising a front panel and a back panel coupled together to form an enclosure with an opening along one side; and a tray configured to slide in and out of the opening of the housing and couple to a transponder, wherein the tray is configured to extend toward the vehicle windshield when the tray is slid out of the opening of the housing and collapse when the tray is slid into the opening, wherein the tray comprises:

a receptacle configured to slidably engage with the housing;

a platform configured to couple to the transponder, the platform configured to engage with the receptacle; and one or more springs between the receptacle and the platform that provide a force to bias the platform away from the receptacle.

19. The shield box apparatus of claim 18, wherein the platform comprises a ramp that engages with an edge of the opening of the housing to provide a compression force when the tray is slid into the opening of the housing.

* * * * *